GEORGE E. CONKLIN
JOHN J. HEIGL      Inventors
JAMES A. WILSON
By W. O. J. Heilman
Patent Attorney

United States Patent Office 3,248,928
Patented May 3, 1966

1

3,248,928
POUR POINT APPARATUS
George E. Conklin, North Plainfield, John J. Heigl, Short
Hills, and James A. Wilson, Stanhope, N.J., assignors
to Esso Research and Engineering Company, a corporation of Delaware
Filed Aug. 1, 1963, Ser. No. 299,363
5 Claims. (Cl. 73—17)

The present application is a continuation-in-part of Serial No. 13,630 filed March 8, 1960, entitled, "Pour Point Apparatus and Process of Using Same"; Inventors: G. E. Conklin et al., now abandoned.

The present invention relates to a novel pour point apparatus and the process of using same. More particularly the present invention relates to an automatic pour point test apparatus for lubricating oils or other heavy hydrocarbon fractions or synthetic lubricating oils which may not necessarily be hydrocarbons. They may be polymerized organic compounds wherein novel electronic means are employed for automatically recording in a semi-continuous manner the temperature of the oil undergoing test and for simultaneously recording the electrical signal output from a photoelectric cell which signal output accurately reflects the mobility of the oil surface undergoing test. Additionally, either separately or simultaneously, the cloud point of the oil may likewise be determined using the same apparatus and the same test procedures, all as will be more fully hereinafter explained.

Conventionally, the cloud and pour points of oils are determined by the test identified as ASTM D-97. Briefly, this test consists in placing a sample of the oil, whose pour point is to be determined, in a stoppered test tube equipped with a thermometer sufficiently inserted into the test tube so that the bulb of the thermometer is immersed in the oil under test. The tube is then placed in a test apparatus which consists of a bath surrounding the test tube, this bath being subject to temperature control so that upon a gradual lowering of the temperature bath the oil under test will also have its temperature lowered. Heretofore, an operator has manually removed the tubes containing the oil under test from the bath and tilted the tube to determine the movement of the oil surface under test. This is done roughly at 5° F. intervals of temperature lowering, the pour point of the sample being taken at 5° F. above the highest temperature at which the oil ceased to move when the test tube was held in a horizontal position. Cloud point tests may be simultaneously carried out with readings being taken by approximately 2° F. intervals until the oil exhibits a distinct cloudiness or haze, at which time the cloud point temperature is read from the thermometer.

In modern day practice in oil refineries, hundreds of the cloud and pour point tests are carried out more or less manually and require the constant presence of an operator whose judgment and skill is largely relied upon for a determination of the pour and cloud points. Manipulations are always made by hand and, for this reason, there is a high variance from sample to sample and from operator to operator so that, for any particular oil under test, the results obtained by several operators may vary as much as 15° F., and there is an extreme lack of reproducibility of results and of accuracy of results using the present ASTM method described.

It is an object of the present invention to more accurately determine cloud and pour points of oils.

It is a further object of the invention to automatically and by electronic means determine and record pour point and cloud point temperatures.

It is a further object of the invention to reduce man hour requirements needed to accurately carry out cloud point and pour point determinations.

It is a further object of the invention to reduce the costs of running the routine cloud and pour point determinations required of the production of oils.

In essence, the novel cloud and pour determination apparatus hereinafter described in detail employs a temperature bath whose temperature is automatically lowered at any designated rate, for example, about 1° F. per minute. Into this bath is placed a tube containing the oil to be tested. Rigidly suspended from the cover or stopper of the tube and with open access to the interior of the tube, there is placed a thermocouple or thermometer which is immersed in the oil under test. Additionally, a light source which may be concentrated by means of a lens, is passed through or plays on the oil surface. A photoelectric cell, for example a photodiode, is also suspended in a stopper so that a change in light intensity striking the photoelectric cell can be recorded provided the change in the light intensity striking the photoelectric cell is due to the movement of the oil surface as will be more fully hereinafter described. A number of arrangements or positions of the light source and the photoelectric cell are possible in order to obtain a change in light intensity caused by reason of the mobility of the oil surface. The device operates on the principle that once the temperature of the oil sample has been lowered sufficiently to render the oil surface immobile, there will be no change in light intensity striking the photoelectric cell and, thus, there will be no change in electrical output signal emanating from the photoelectric cell. The use of the novel automatic pour point apparatus provides a method for automatically sensing the pour point of a particular oil under test without requiring the attention of an operator except on a more or less intermittent basis. Movement of the oil is also provided by automatic means, i.e., the sample container is rocked by an electrically driven means while the sample is being cooled on a graduated or constantly lowered temperature basis. The photoelectric means are employed to sense whether the oil has reached its congealing point whether or not the oil surface remains mobile or immobile. The congealing temperature of the oil is determined by a temperature sensing device as before stated; i.e., either through visual means, by means of a thermometer or, more appropriately, by an electric device such as a thermocouple. The essential point involved in the successful operation of the apparatus involves a determination of the point at which the movement of the oil surface ceases. At this point, recording means print out a sample identification number and the temperature at which the pour point was reached. One simple and satisfactory arrangement (alternative methods being shown in the drawings) involves a light bulb or other source of light and a photoelectric cell, each mounted in the cap of the pour point test jar or tube. By means of a lens, a light is focused on the surface of the oil with the beam being approximately perpendicular to the surface. As the jar is tilted, the fluid will cause the reflected light beam to sweep across the face of the photoelectric cell. When the light beam is reflected directly onto the photosensitive surface of the cell, a peak in the photoelectric cell current occurs. While the sample is in the liquid state, such a phenomenon takes place twice during each tipping cycle, but as the temperature of the sample is lowered to its pour temperature where it is no longer fluid, no fluctuations in photoelectric current occur.

It has also been discovered that the reflective angle of the light beam directed to the surface of the sample also becomes less as the viscosity of the sample becomes greater. Consequently, a viscosity value is eventually reached at which point the light beam does not completely pass over the surface of the photosensitive cell and is thus not able to return to its original position by passing over the photosensitive surface a second time since the light beam has just barely reached the photosensitive surface of the cell. For example, in a particular oil under test, two separate signals were produced by the tilting cycle as the temperature was lowered from 72° F. to 22° F. But below 22° F. and up to the point where the sample no longer flowed, namely at about 18° F., only a single electrical signal tilting cycle was produced by the photoelectric cell and this was of a continuing but reduced intensity. At 17° F., this particular oil sample became solid and no signal was observed or recorded from the photoelectric cell because the light beam was then striking the oil surface perpendicular to it and, since the surface did not move, the light beam was no longer reflected in any direction except directly back to the original light source.

Referring now to the drawings,

FIG. 3 shows a plan view of means for imposing an optical grid on the surface of the test specimen.

Figure 1:
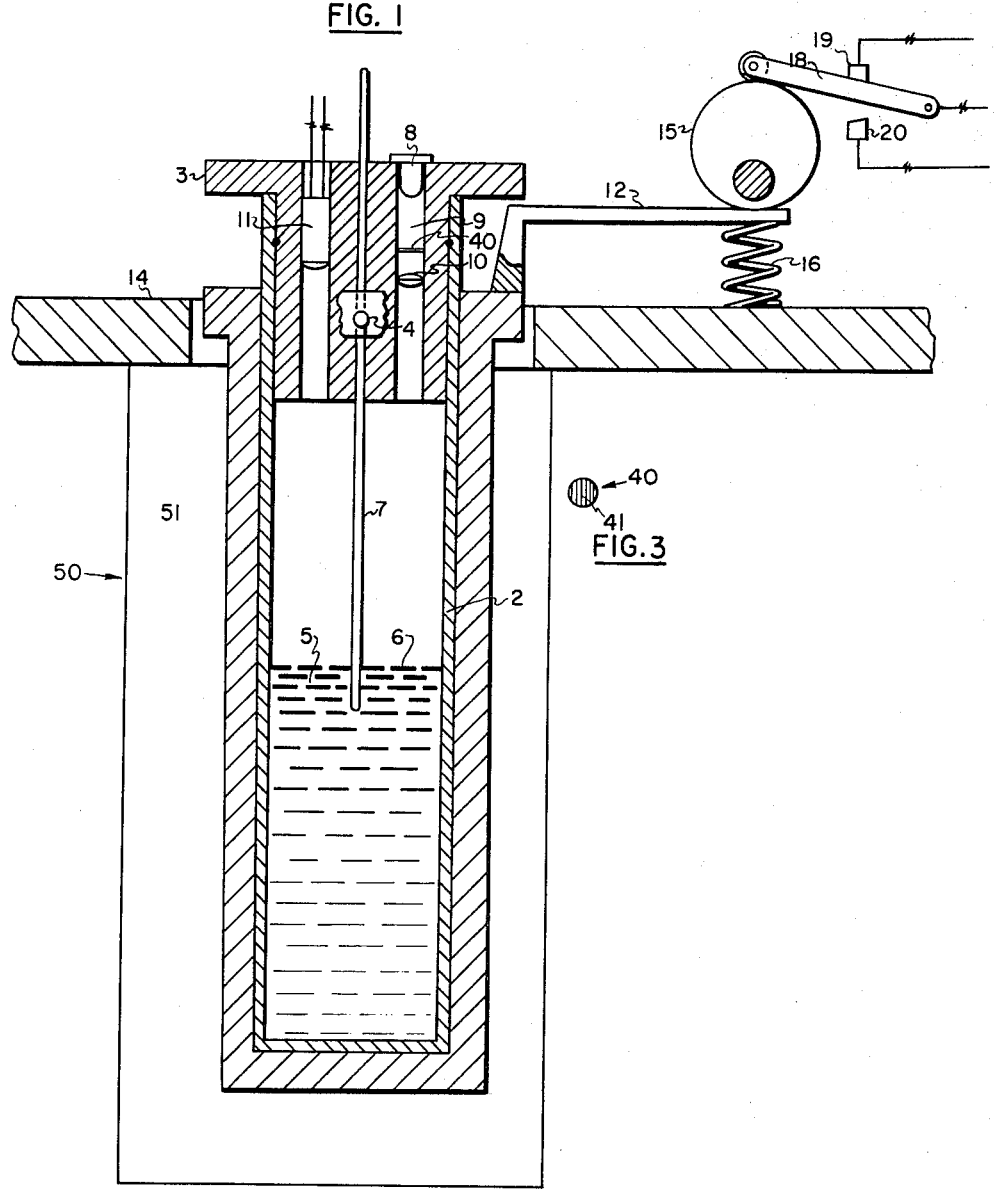
FIGURE 1 shows in more or less schematic outline and in sectional elevation, the components and make-up of the preferred form of automatic pour point apparatus.

Referring now to FIGURE 1, a test tube or jar 2 is suspended by means of axle or pivot 4 from the roof 14 of a temperature control bath 50 so that the jar 2 is immersed in a liquid 51 whose temperature is gradually being lowered, for example, about 1 to 2° F. per minute. An oil sample 5 is placed in a test tube or jar 2 and a thermocouple 7 is immersed in the oil for the purpose of recording the temperature of the oil as it is lowered and for the purpose of determining the pour point temperature when it is reached. In the cover or lid 3 of the test tube or jar 2, there is mounted light bulb 8 whose beam is concentrated by means of lens 10 and which strikes oil surface 6 perpendicularly to that surface. Additionally, photoelectric cell 171 is mounted in the lid or cover 3 and is adapted to receive light reflected from the oil surface 6 upon movement of that oil surface. The light beam passes into the interior of tube 2 through the opening 9. The photosensitive surface of the photoelectric cell 11 is placed downwardly so that there is open communication between the photosensitive surface and reflected light from the oil surface 6. Approximately once each minute, cam 15 which is driven through a gear box (not shown) and at about one revolution per minute, depresses arm 12 so that the entire tube 2 and its contents is tilted about 10° to the left since the tube will rotate about the pivot or axis 4. By means of spring tension 16, when the cam reaches the position shown in the figure, the spring 16 will have returned the tube 2 to its original position. Once the temperature of the oil sample 5 has been sufficiently lowered so that the oil surface 6 no longer moves when tube 2 is tilted to the left by operation of cam 15 and arm 12, the light beam no longer will be reflected to the photoelectric cell 11 from the oil surface 6 because there will have been no movement of the oil surface 6. By means of a multiple point recorder connected into the system and as hereinafter more fully described, the temperature recorded from thermocouple 7 at that point becomes the pour point of the oil.

In one series of tests employing the apparatus shown in FIGURE 1, a series of nine repeat determinations on a single oil sample was caried out with the result that the pour point in ° F. showed a maximum variation of 2° F. Any error in the determination of the pour point employing the device described and shown in FIGURE 1 is not greater than ±1° F.

A preferred adaptation of the invention is to position a transparent plastic or glass 40 in front of the light source 8, preferably between light source 8 and lens 10. This plastic or glass unit 40 has a plurality of fine lines 41 (FIGURE 3) which are parallel to the axis of rotation. Thus, for example, if the cap has a diameter of 1¼" and the passageway has a diameter of ⅜", effective results would be secured by having a plurality of 6 lines of a diameter of 1 mm. As pointed out heretofore, it is essential that these lines be substantially parallel to the axis of rotation. This aperture causes a grid pattern of light and dark bands to be projected on the oil surface. This light pattern causes a greater variation in light reflected to the photocell when there is movement in the oil surface. It is within the scope of the invention to utilize a physical grid of the type described under certain circumstances in lieu of the transparent element 40 having imposed dark lines thereon.

Figure 2:
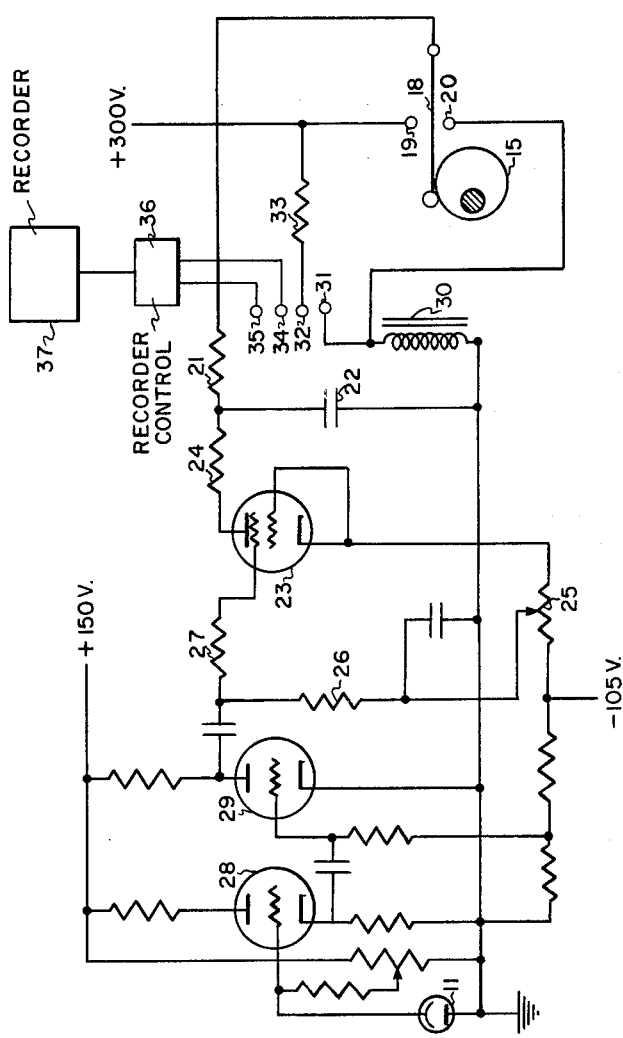
FIGURE 2 illustrates the electrical circuitry required for receiving the photoelectric signal and the electrical impulses from a thermocouple and for recording on a multipoint recorder on a semi-continuous basis the temperature of the oil and the electrical output signal from the photoelectric cell.

Refering now to FIGURE 2, at the beginning of the operating sequence, the motion of eccentric cam 15 causes switch segment 18 to contact 19. This contact connects +300 volts to resistor 21 and charges capacitor 22. The voltage across capacitor 22 appears at the plate of thyratron 23 through resistor 24. Thyratron 23 does not conduct with the application of positive voltage on the plate due to the presence of grid bias voltage obtained from voltage divider 25 and the negative 105 volt source connected through resistors 26 and 27. As eccentric 15 continues to move, it causes motion of the sample in the apparatus described in FIGURE 1 which results in a change in light level at photocell 11. An increase of light level at the photocell 11 causes a negative signal at the grid of cathode follower 28. The output of the cathode follower 28 through voltage amplifier 29 impresses a positive signal at the grid of thyratron 23 causing conduction which discharges capacitor 22 through resistor 24. Thyratron 23 continues to conduct until switch contacts 18 and 19 are opened by the action of eccentric cam 15. At this time, switch contact 18 is connected to contact 20 but relay 30 is not thus actuated because capacitor 22 has been discharged by thyratron 23. As the rotation of eccentric cam 15 continues, capacitor 22 is recharged through switch contacts 18 and 19 and resistor 21. Assuming that the motion of eccentric cam 15 impressed on the sample container 2 in FIGURE 1 does not result in a motion of the oil sample surface 6 as is the case when the pour point is reached, no light change will occur at photocell 11 and no electrical signal will be available to cause conduction of thyratron 23. When the eccentric cam 15 causes switch contact 18 to connect to contact 20, relay 30 will be activated by the voltage from capacitor 22 through resistor 21. The actuation of relay 30 closes contacts 31 and 32 and connects relay 30 to +300 volts through resistor 33. The actuation of relay 30 also closes contacts 34 and 35 which causes recorded control 36 to command recorder 37 to hold its last reading which is the pour point.

It is essential in accordance with the present invention that the light source and the photocell be an integral part of the cap of the tube so that they tilt or rock with the tube. When the means for detecting the tilting of the surface of the liquid are outside the test tube, the photocell receives reflected light continuously until the surface tilts and then suddenly the light is cut off from the cell. It is a situation of "on or off." But, while this may be all right for detecting the solidification point of a liquid that freezes suddenly, it is no good for the pour point of oil.

Oil does not solidify suddenly. It gets increasingly more viscous and sluggish, until it becomes practically plastic. In this condition, its surface will tilt, when its container is tilted, long before the pour-point is reached. The pour-point of an oil is more nearly the temperature at which plastic flow ceases under its own head, than the temperature at which the surface begins to tilt when the container is tilted.

However, in the apparatus of the present invention, with the photocell and the light bulb both within the cap of the test tube, the photocell receives reflected light all of the time that the bulb is lit. Being close to the bulb, the cell detects changes in light intensity over very small regions of the liquid surface as the test tube is rocked. The cell detects very small changes, and even the rate of change, of light intensity. It detects two peaks in intensity in each rocking cycle. The disappearance of the second peak is an indication that the pour point is approaching. The decrease in magnitude of the other peak further monitors the approach to the pour point. The electronic system, with an opposing voltage on the thyratron tube, can be adjusted finely to record the surviving peak at an empirically established minimum, so that the decay of the signal need not proceed indefinitely and the test can be stopped sharply when the critical minimum peak is reached.

What is claimed is:

1. An apparatus for determining the pour point of oils comprising a container adapted to hold oil and mounted at the top on a rigid and stationary horizontal axle and thus capable of rotating in a vertical plane, a light beam source integral with the container top and positioned to permit said beam to downwardly strike the surface of oil within said container, a transparent member containing a plurality of dark parallel lines positioned in front of said light beam, said parallel lines being parallel to the axis of rotation, a photoelectric cell integral with said container top and positioned to permit the light beam to be reflected from the oil surface onto said cell only upon angular movement of said surface with respect to said container, a thermocouple within said container and positioned so as to be immersed in oil within said container, cooling means positioned about said container adapted to lower the temperature of the oil within said container and means for periodically and partially swinging said container about the horizontal axle.

2. An apparatus as in claim 1 wherein an arm, in rigid connection to said container extends from the top of said container, is moved by contact with a rotating cam, said arm being maintained in constant contact with said cam by means of spring tension.

3. An apparatus as in claim 1 wherein the swing of said container from the vertical position is between about 5° and about 30° on at least one side of the vertical position.

4. An apparatus for determining the pour point of oils comprising in combination a container adapted to hold oil and mounted at the top on a rigid and stationary horizontal pivot and thus capable of rotating in a vertical plane, a container cap positioned at the top of said container, two apertures extending longitudinally through said cap, a light beam source positioned within one of said apertures to permit said beam to strike the surface of oil within said container, a photoelectric sensing element positioned within the other of said apertures to change its electrical signal output upon angular movement of the oil surface with respect to said container, a temperature sensing means within said container and positioned so as to be immersed in oil within said container, cooling means positioned about said container adapted to lower the temperature of the oil within said container, and means for periodically and partially swinging said container about the horizontal pivot.

5. Apparatus as defined by claim 4 wherein said apertures are so positioned that said light beam is projected vertically downwardly when the longitudinal axis of said container is vertical.

References Cited by the Examiner
UNITED STATES PATENTS

| | | | |
|---|---|---|---|
| 3,031,880 | 5/1952 | Findlay | 73—17 |
| 3,077,764 | 2/1963 | Kapff | 73—17 |
| 3,161,039 | 12/1964 | Kapff | 73—17 |
| 3,187,557 | 6/1965 | Holbourne | 73—17 |

RICHARD C. QUEISSER, *Primary Examiner.*

J. C. GOLDSTEIN, *Assistant Examiner.*